United States Patent
Jin (10) Patent No.: US 9,417,324 B2
(45) Date of Patent: Aug. 16, 2016

(54) PHASE REFERENCE SHIFT FOR SAR IMAGES GENERATED FROM SUB-APERTURE ALGORITHMS

(71) Applicant: RAYTHEON COMPANY, Waltham, MA (US)

(72) Inventor: Michael Y. Jin, San Gabriel, CA (US)

(73) Assignee: RAYTHEON COMPANY, Waltham, MA (US)

( * ) Notice: Subject to any disclaimer, the term of this patent is extended or adjusted under 35 U.S.C. 154(b) by 303 days.

(21) Appl. No.: 14/180,700

(22) Filed: Feb. 14, 2014

(65) Prior Publication Data

US 2015/0234043 A1 Aug. 20, 2015

(51) Int. Cl.
*G01S 13/90* (2006.01)

(52) U.S. Cl.
CPC .............. *G01S 13/9035* (2013.01); *G01S 13/90* (2013.01)

(58) Field of Classification Search
CPC ........................................ G01S 13/90–13/9035
See application file for complete search history.

(56) References Cited

U.S. PATENT DOCUMENTS

| | | | | |
|---|---|---|---|---|
| 5,343,204 A | * | 8/1994 | Farmer | G01S 13/9035 342/195 |
| 5,627,543 A | * | 5/1997 | Moreira | G01S 13/90 342/25 A |
| 5,969,662 A | | 10/1999 | Hellsten | |
| 6,255,981 B1 | | 7/2001 | Samaniego | |
| 6,670,907 B2 | * | 12/2003 | Cho | G01S 7/4021 342/196 |
| 7,567,198 B2 | * | 7/2009 | Smith | G06T 17/05 342/192 |
| 8,344,934 B2 | * | 1/2013 | Ryland | G10S 13/9035 342/179 |

FOREIGN PATENT DOCUMENTS

| | | |
|---|---|---|
| CN | 101710174 A | 5/2010 |
| CN | 102721964 A | 10/2012 |

OTHER PUBLICATIONS

Magotra, Neeraj; Puri, M., "Synthetic Aperture Radar Image Formation," 1990 International Conference on Acoustics, Speech, and Signal Processing. vol. 4, pp. 1869-1872. Apr. 3-6, 1990. doi: 10.1109/ICASSP.1990.115860.*

Moreira, A. (1991), A New Subaperture Approach for Real-Time SAR Processing. European Transactions on Telecommunications. vol. 2, issue 6: 619-628. doi: 10.1002/ett.4460020604.*

Andersson, "On the Determination of a Function from Spherical Averages", Society for Industrial and Applied Mathematics, vol. 19, No. 1, Jan. 1988, pp. 1-19.

Cafforio et al., "SAR Data Focusing Using Seismic Migration Techniques", IEEE Transactions on Aerospace and Electronic Systems, vol. 27, No. 2, Mar. 1991, pp. 194-207.

GB Search Report; GB Application No. GB1502382.3; Date of Mailing: Jul. 16, 2015; 3 pages.

Lundgren et al. , "Implementing SAR image processing using backprojection on the Cell Broadband Engine", Radar Conference, 2008. Radar '08. IEEE 2008 , pp. 1-6.

(Continued)

*Primary Examiner* — Matthew M Barker
(74) *Attorney, Agent, or Firm* — Cantor Colburn LLP (57) ABSTRACT

Embodiments are directed to generating a plurality of sub-images associated with a target via a synthetic aperture radar, processing, by a processor, the sub-images using a sub-aperture algorithm to generate an intermediate image, and applying, by the processor, a phase shift to the intermediate image to generate an output image.

17 Claims, 6 Drawing Sheets

(56) References Cited

OTHER PUBLICATIONS

McCorkle, "An order N2log(N) backprojector algorithm for focusing wide-angle wide-bandwidth arbitrary-motion synthetic aperture radar", SPIE col. 2747, downloaded from http://proceedings.spiedigitallibrary.org/ on Dec. 6, 2013, pp. 25-36.

Ulander, "Synthetic-Aperture Radar Processing Using Fast Factorized Back-Projection", IEEE Transactions on Aerospace and Electronic Systems, vol. 39, No. 3, Jul. 2003, pp. 760-776.

Yegulalp, "Fast Backprojection Algorithm for Synthetid Aperture Radar", IEEE 1999, pp. 60-65.

* cited by examiner

PHASE REFERENCE SHIFT FOR SAR IMAGES GENERATED FROM SUB-APERTURE ALGORITHMS

BACKGROUND

The present disclosure relates to electronics, and more specifically, to the use of radars in formulating images in accordance with one or more algorithms.

Radar may be used in connection with one or more applications. For example, a radar located on an aircraft may be used to obtain information regarding the distance of the aircraft from the ground or one or more targets or objects located on the ground. The radar may emit a signal or pulse and a scatter from a return signal may be analyzed to generate an image of a surrounding environment. For a scatter at a distance 'R' to the radar, the return signal may take the form:

$$s(t) = a * p(t-\tau) * e^{j\theta(\tau)},$$

where
  'a' represents an attenuation factor associated with an emitted pulse 'p(t)',
  '$\tau$' represents a two-way delay time given by:
  $\tau = 2*R/c$, where 'c' is representative of the speed of the emitted pulse and the return signal,
  '$\theta(\tau)$' represents a phase term of the form $-4\pi R/\lambda$ resulting from a delay time and center frequency of the emitted pulse, and
  '$\lambda$' represents a wavelength of a center band or carrier frequency of the pulse.

A synthetic aperture radar (SAR) continuously emits radar pulses and collects return signals. SAR images may be generated using full aperture algorithms (FAA) and sub-aperture algorithms (SAA). When a SAR image is presented in complex form, the phase component, for most images processed using FAA, represents the two-way delay time between the averaged scatter within a pixel and the center of the full aperture. Since the location of the average scatter is very close to the pixel grid location, the major portion of this phase represents the two-way delay time between the pixel grid location and the center of the full aperture. This major phase component, however, does not exist in SAR images processed using SAA.

The lack of the phase component using SAA results in difficulty in terms of applying coherent change detection (CCD) and autofocus processes or algorithms. For example, between two repeat passes, complex images may have very different phases and may be difficult to cancel in complex form. Interference between nearby targets may make it difficult to obtain a phase error measurement.

SUMMARY

According to one embodiment, a method comprises: generating a plurality of sub-images associated with a target via a synthetic aperture radar, processing, by a processor, the sub-images using a sub-aperture algorithm to generate an intermediate image, and applying, by the processor, a phase shift to the intermediate image to generate an output image.

According to another embodiment, an apparatus comprises: at least one processor, and memory having instructions stored thereon that, when executed by the at least one processor, cause the apparatus to: cause a plurality of sub-images associated with a target to be generated via a synthetic aperture radar, process the sub-images using a sub-aperture algorithm to generate an intermediate image, and apply a phase shift to the intermediate image to generate an output image.

According to another embodiment, an aircraft comprises: a synthetic aperture radar, and a computing device configured to: obtain data corresponding to a plurality of sub-images associated with a target based on pulses emitted via the synthetic aperture radar, process the sub-images using a sub-aperture algorithm to generate an intermediate image, and apply a phase shift to the intermediate image to generate an output image.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for providing a phase reference shift to synthetic aperture radar (SAR) images generated using sub-aperture algorithms (SAA). In some embodiments, a phase associated with an image may be manipulated prior to summing the images. Subsequently, a phase term may be added to the phase of an image. The phase term may have the effect or impact of rendering resultant images that are consistent with images obtained using full aperture algorithms (FAA).

Figure 1:
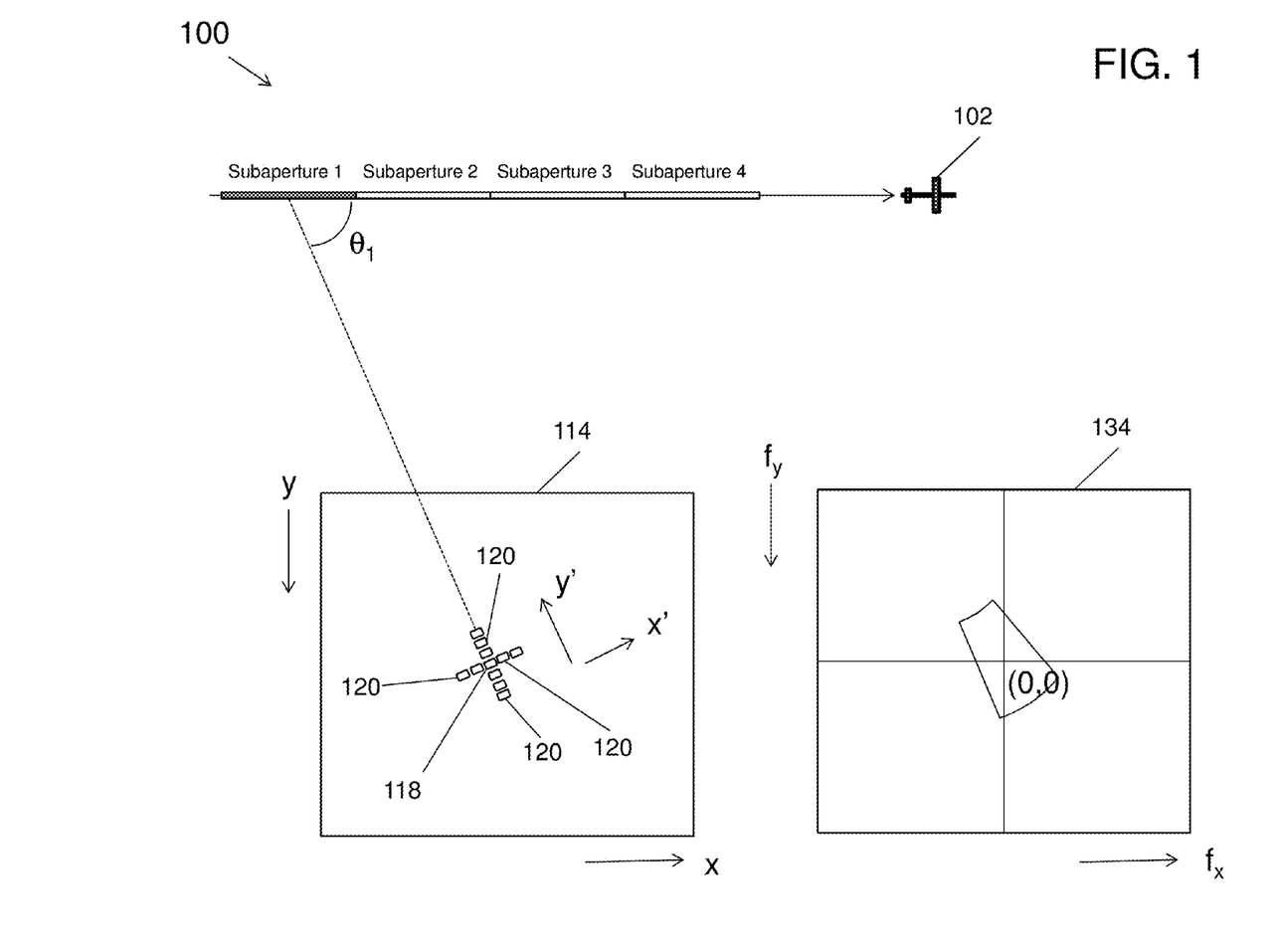
FIG. 1 illustrates a system environment providing for a target phase and spectra before phase removal in sub-aperture algorithm (SAA) images.

Referring to FIG. 1, a system environment 100 is shown. The system environment 100 may include an aircraft 102 that may generally travel in a direction from left to right in FIG. 1. The aircraft 102 may be equipped with a radar for purposes of detecting a potential target of interest. In this respect, the aircraft may emit pulses in connection with one or more subapertures, denoted in FIG. 1 as subaperture 1 through subaperture 4. For example, a pulse may be emitted from subaperture 1 at an angle, $\theta_1$, relative to the aircraft 102 direction of travel as shown in FIG. 1.

As shown in a viewbox 114, an emitted pulse may be directed to a target or potential target, the center of which is located at a point 118. Additional points 120 associated with the target are shown. The additional points 120 may correspond to side lobes that may be present in a log domain representation.

Also, the viewbox 114 is shown in connection with an x-y coordinate system having been superimposed. For the sake of convenience and mathematical simplicity, a slanted or primed x'-y' coordinate system local to the target 118 may be introduced.

The impulse response associated with the target 118 at a distance $R_1$ to the center of subaperture 1 may assume a shape in accordance with a product of two sinc functions:

$$\text{sinc}(x'/\Delta x')*\text{sinc}(y'/\Delta y'),$$

and may assume a phase in exponential form:

$$\exp(-j4\pi R_1/\lambda).$$

Referring to the viewbox 134, which may represent at least a portion of the frequency spectrum or content of the impulse response, the center of the frequency content may reside at coordinates (0,0). The centering of the frequency content around (0,0) may be based on the notion or assumption that the phase is common or the same for all the pixels of a pixel grid. This assumption may be relaxed to account for the fact that most of the pixels will themselves have a distance component or element with reference to the subapertures.

Figure 2:
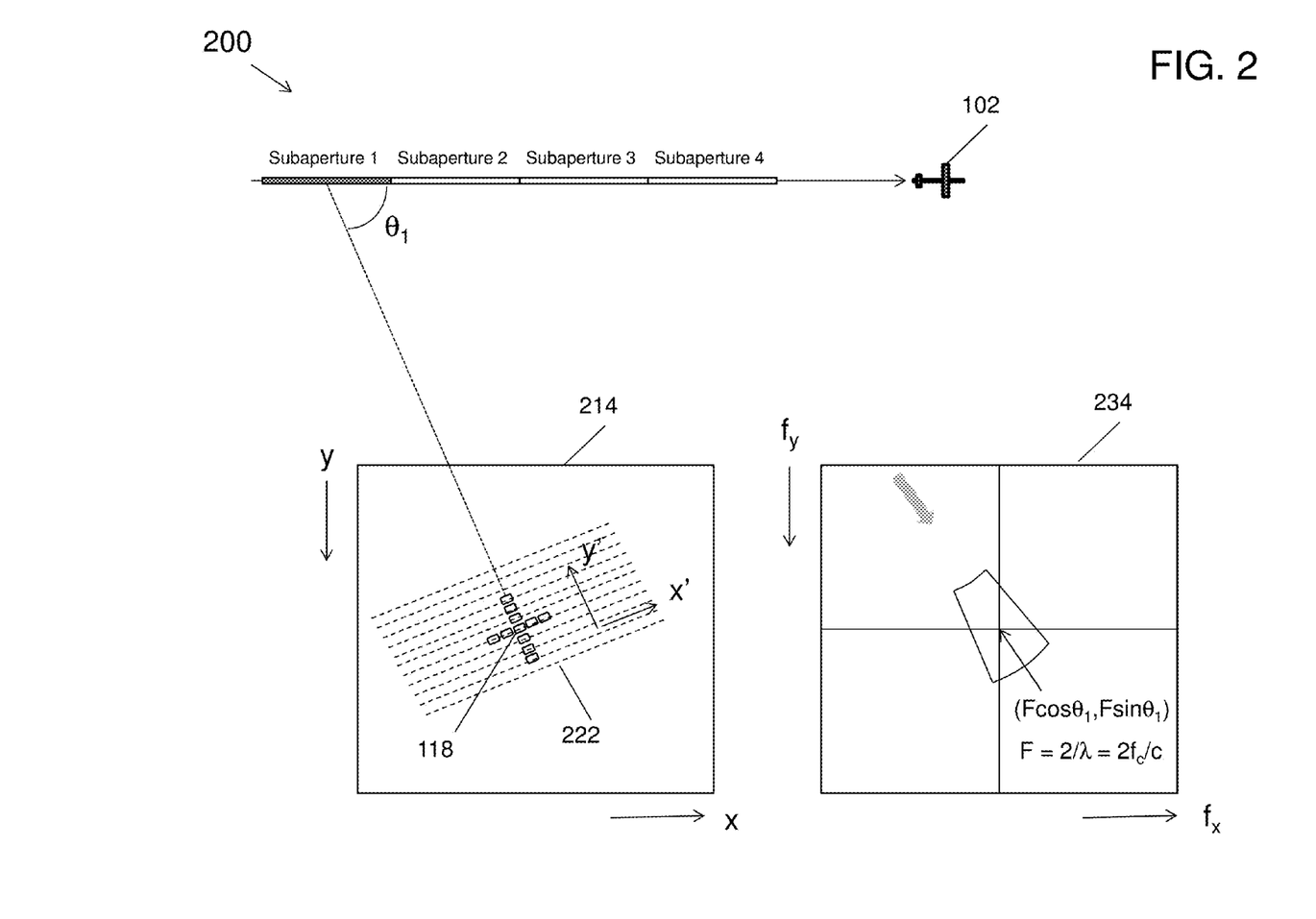
FIG. 2 illustrates a system environment providing for the target phase and spectra after phase removal in the SAA images.

Referring to FIG. 2, a system environment 200 is shown. As shown in a viewbox 214, dashed phase front or iso-range lines 222 are shown as having been superimposed. The iso-range lines 222 may be used to convey that a distance, $R_{pixel}$, may exist from each pixel of a pixel grid to the center of a subaperture (e.g., subaperture 1). On this basis, the phase of the impulse response may be adjusted or manipulated so as to take the form:

$$\exp(-j4\pi(R_1-R_{pixel})/\lambda)$$

As shown in the viewbox 234, the frequency content may undergo a corresponding shift in terms of the center of the frequency content residing at coordinates given by (F cos $\theta_1$, F sin $\theta_1$), where:

$$F=2/\lambda=2f_c/c$$

It should be noted that in FIG. 2 the iso-range lines 222 are depicted as being relatively straight. This may be the result of the viewbox 214 depicting a close-up view with respect to the target 118. If a wider or zoomed-out view was depicted, the iso-range lines 222 may appear to have curvature associated with them, such that the iso-range lines 222 may take on a circular form or shape.

Figure 3:
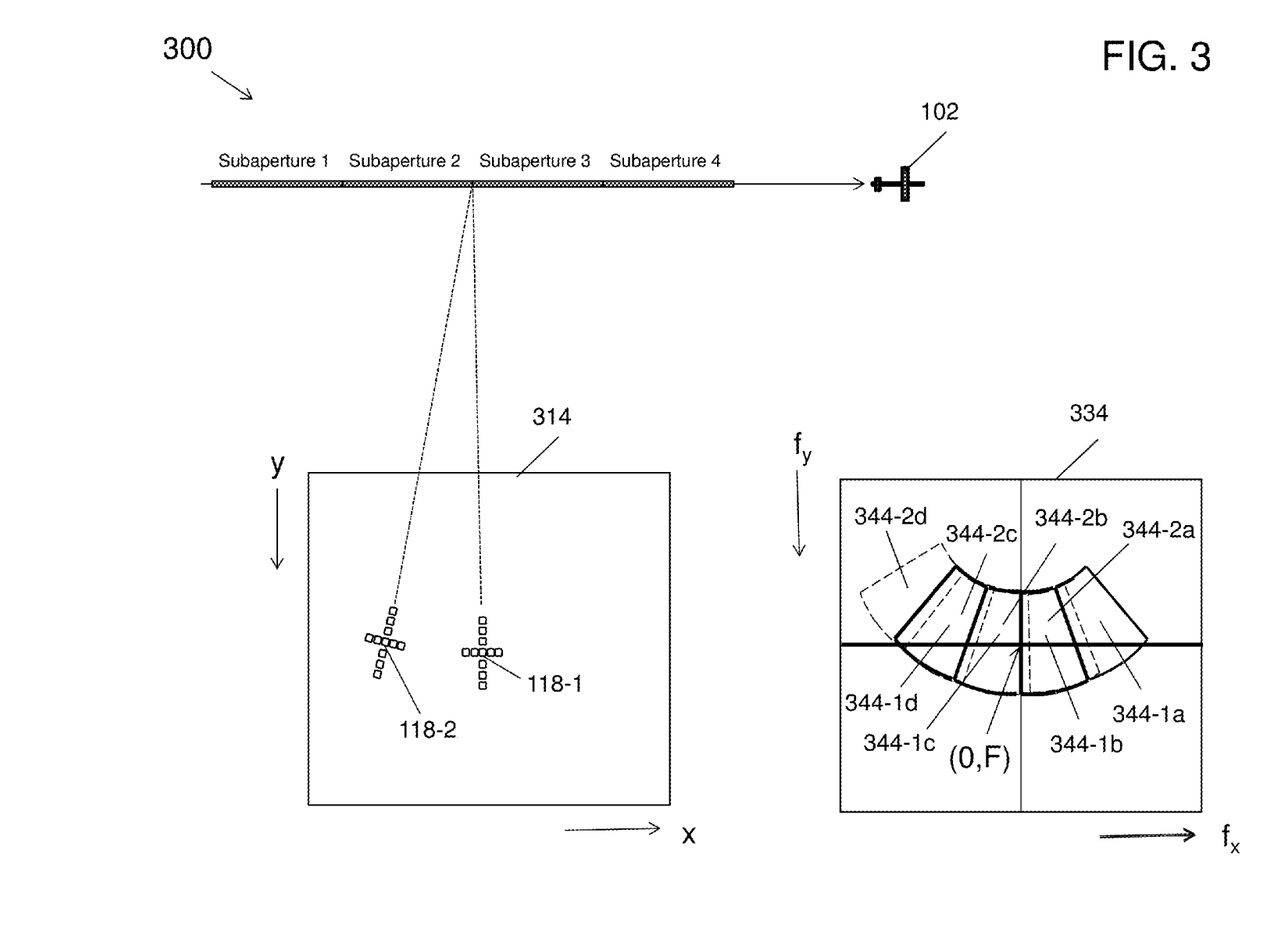
FIG. 3 illustrates a system environment providing for the target phase and spectra of full resolution images resulting from a coherent summation of subaperture images.

Referring to FIG. 3, a system environment 300 is shown. As shown in a viewbox 314, two targets 118, each denoted via a respective center point 118-1 and 118-2, are depicted. The frequency content associated with the viewbox 314 is shown in viewbox 334. In particular, the frequency content may take on the shape of a portion of a fan composed of fan blades 344.

Fan blade 344-1a may be associated with target 118-1 and subaperture 1. Fan blade 344-1b may be associated with target 118-1 and subaperture 2. Fan blade 344-1c may be associated with target 118-1 and subaperture 3. Fan blade 344-1d may be associated with target 118-1 and subaperture 4.

Fan blade 344-2a may be associated with target 118-2 and subaperture 1. Fan blade 344-2b may be associated with target 118-2 and subaperture 2. Fan blade 344-2c may be associated with target 118-2 and subaperture 3. Fan blade 344-2d may be associated with target 118-2 and subaperture 4.

In FIG. 3, fan blades 344-2a through 344-2d are shown with broken or dashed lines so as to distinguish from fan blades 344-1a through 344-1d.

The fact that the fan blades 344-1a through 344-1d (and similarly, the fan blades 344-2a through 344-2d) do not overlap with one another and do not include any gaps between them indicates that the results of applying SAA and then coherently summing the images generated using each of the subapertures renders results that generally correspond to application of FAA.

One qualification should be made at this point in the disclosure regarding the frequency content shown in the viewbox 334. As shown, the frequency content generally resides around a center point of (0,F) in FIG. 3. Using FAA, the frequency content generally resides around a center point of (0,0).

Figure 4:
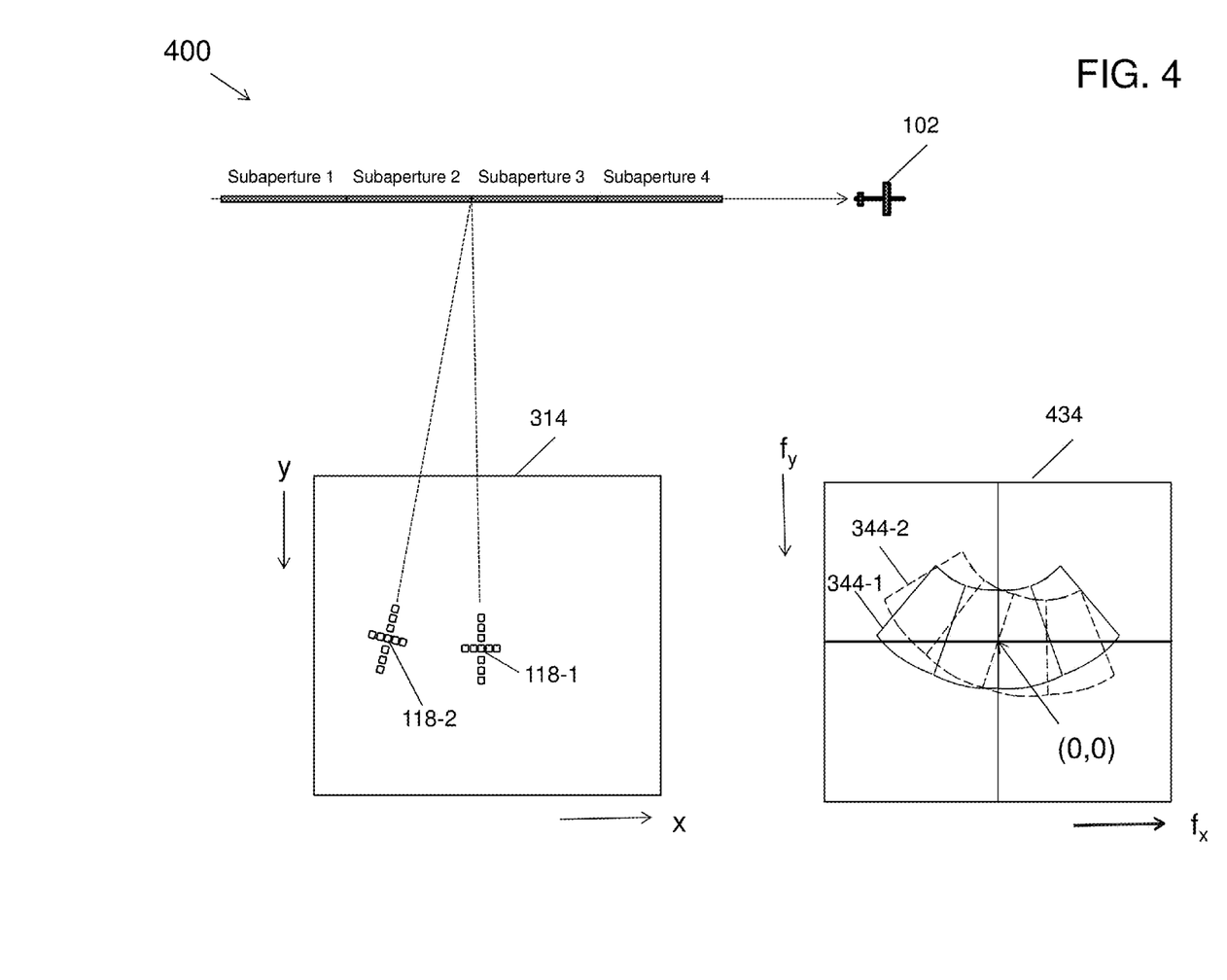
FIG. 4 illustrates a system environment for providing for the inclusion of a phase term to the full resolution images.

To account for this difference in frequency content center points between SAA and FAA, a phase term may be added to the phase of the image associated with FIG. 3. In particular, the phase term may take the form:

$$\exp(-j4\pi R_{pixel}/\lambda),$$

which may account for the phase adjustment or manipulation described above in connection with FIG. 2. As shown in FIG. 4, following application or addition of the phase term, the frequency content of fans 344-1 and 344-2 associated with targets 118-1 and 118-2, respectively, may be centered about (0,0). In FIG. 4, fan 344-2 is shown with broken or dashed lines so as to distinguish from fan 344-1.

The foregoing description may be expressed in more detailed mathematical terms. For example, $IM_{SSA}(i,j)$, $i\in[1,N]$, $j\in[1,N]$ may represent a complex SAR image array generated by any sub-aperture SAR algorithm. This array has N×N pixels with a complex number associated with each pixel.

$$\vec{x}_{AC}\left(\frac{T}{2}\right)$$

may represent the aircraft 102's position at the center of the full aperture which has a time duration of T. $\vec{x}_{pixel}(i,j)$ may represent the position of pixel (i,j). The phase reference shifted SAR image IM(i,j) may be given by:

$$IM(i,j)=IM_{SSA}(i,j)\cdot\exp\{-4\pi R_{AC\_pxl}(i,j)/\lambda\},$$

where $R_{AC_{pxl}}(i,j)$ is the distance between the aircraft position $$\vec{x}_{AC}\left(\frac{T}{2}\right)$$

and the pixel position $$\vec{x}_{pixel}(i,j), \text{i.e. } R_{AC_{pxl}}(i,j) = \left|\vec{x}_{pixel}(i,j) - \vec{x}_{AC}\left(\frac{T}{2}\right)\right|.$$

Figure 5:
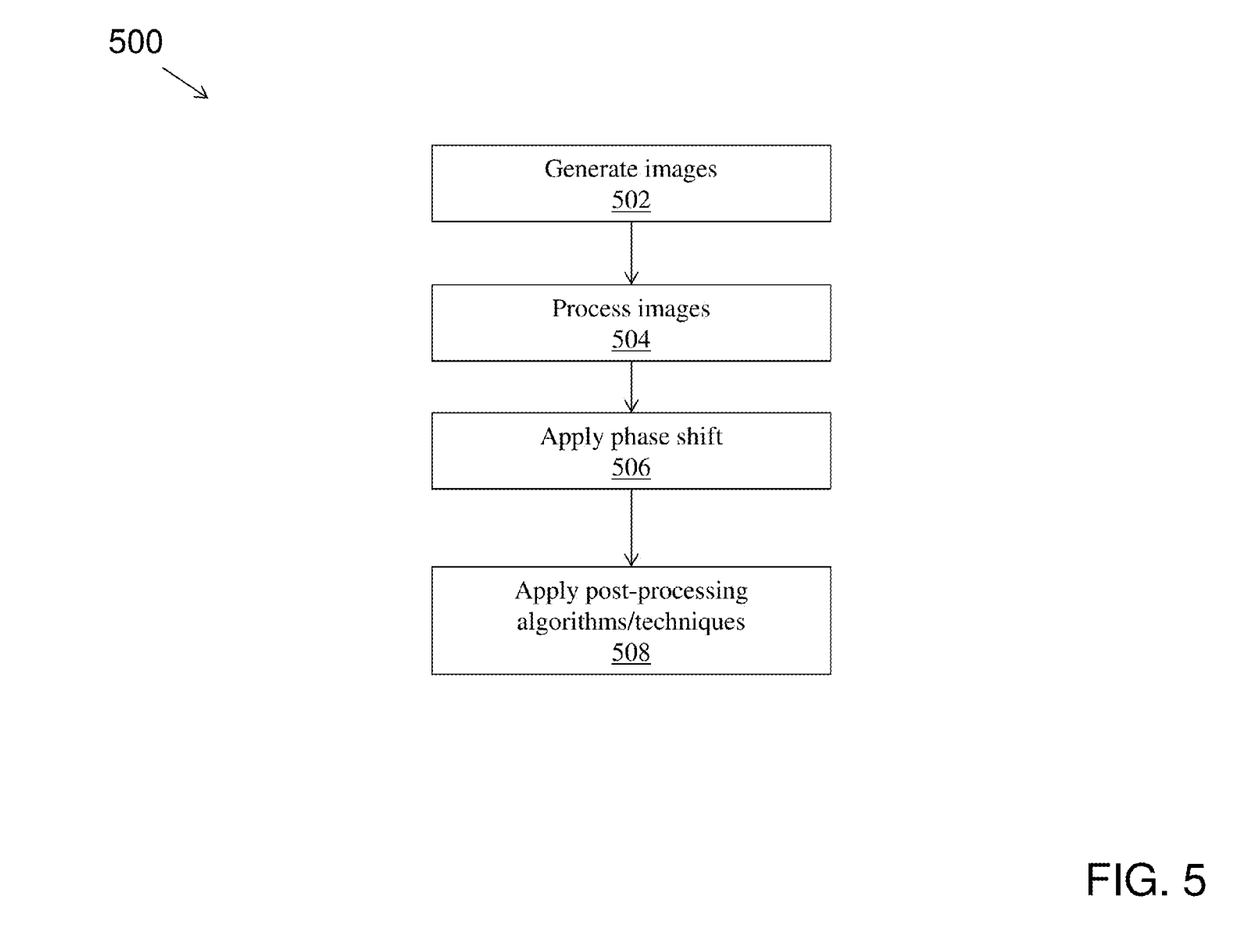
FIG. 5 illustrates a flow chart of an exemplary method.

Referring now to FIG. 5, a flow chart of an exemplary method 500 is shown. The method 500 may execute in accordance with one or more devices, components, or systems, such as those described herein. The method 500 may be used to provide a phase reference shift to synthetic aperture radar (SAR) images generated using sub-aperture algorithms (SAA).

In block 502, one or more images or sub-images may be generated. For example, the images or sub-images may be generated using one or more subapertures.

In block 504, the images of block 502 may be processed to generate an intermediate image. Such processing may include processing the images or sub-images of block 502 using SAA.

In block 506, a phase shift may be applied to the intermediate image of block 504. The phase shift may be applied on a pixel-by-pixel basis. The result of the application of the phase-shift may be an output image.

In block 508, one or more post-processing algorithms or techniques may be applied. For example, coherent change detection (CCD) and autofocus processes or algorithms may be applied.

The method 500 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown in FIG. 5.

Figure 6:
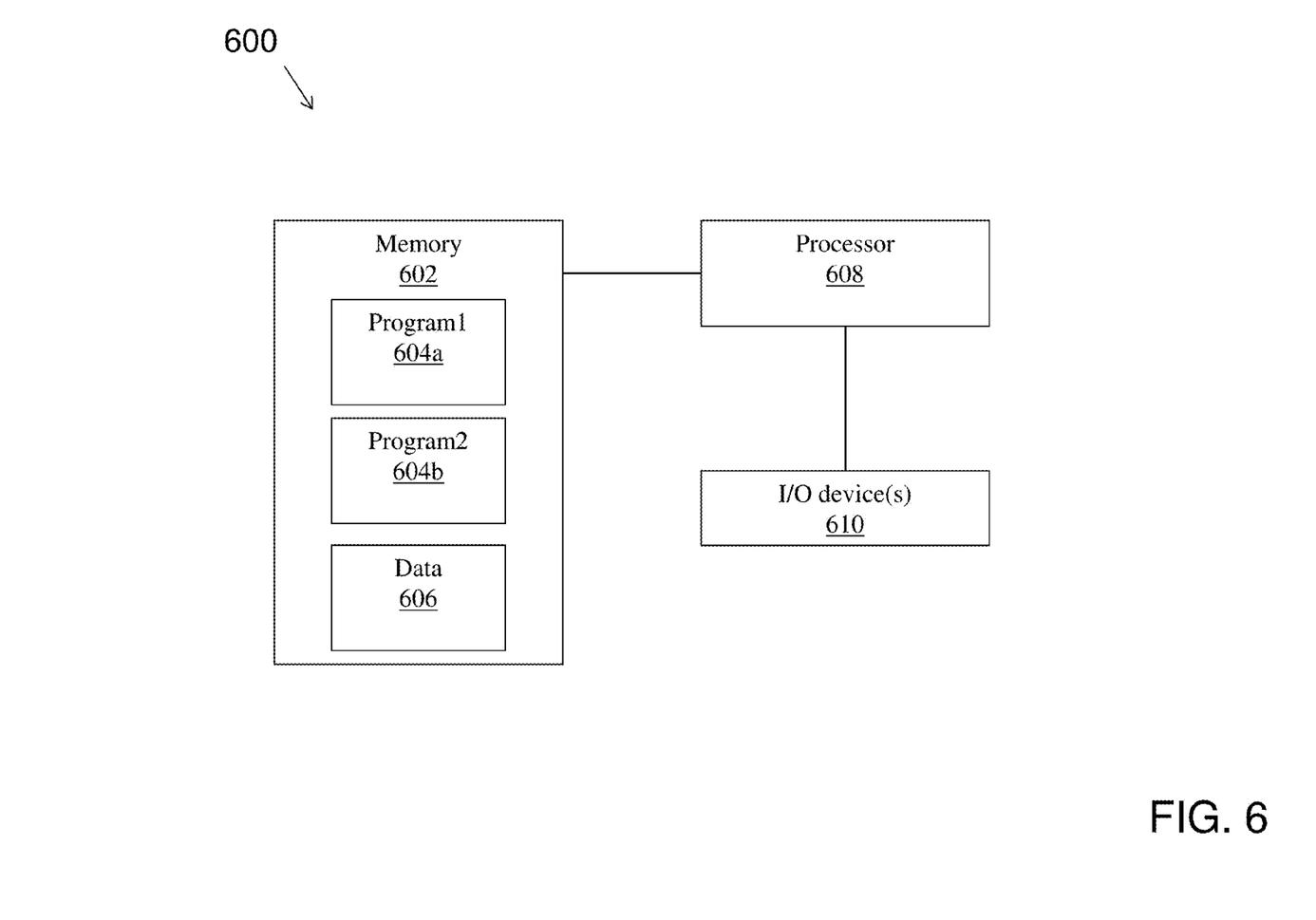
FIG. 6 illustrates an exemplary computing system.

Referring to FIG. 6, an exemplary computing system 600 is shown. The system 600 is shown as including a memory 602. The memory 602 may store executable instructions. The executable instructions may be stored or organized in any manner and at any level of abstraction, such as in connection with one or more applications, processes, routines, methods, etc. As an example, at least a portion of the instructions are shown in FIG. 6 as being associated with a first program 604a and a second program 604b.

The memory 602 may be configured to store data 606. Data 606 may include data originating from one or more sources. The data 606 may correspond to images generated using one or more subapertures.

The instructions stored in the memory 602 may be executed by one or more processors, such as a processor 608. The processor 608 may be configured to process the data 606. For example, the processor 608 may be configured to sum the images and then apply a phase term or phase shift to the output of the summation.

The processor 608 may be coupled to one or more input/output (I/O) devices 610. In some embodiments, the I/O device(s) 610 may include one or more of a keyboard or keypad, a touchscreen or touch panel, a display screen, a microphone, a speaker, a mouse, a button, a remote control, a joystick, a printer, etc. The I/O device(s) 610 may be configured to provide an interface to allow a user or another entity (e.g., another computing entity) to interact with the system 600.

The system 600 is illustrative. In some embodiments, one or more of the entities may be optional. In some embodiments, additional entities not shown may be included. For example, in some embodiments the system 600 may be associated with one or more networks. In some embodiments, the entities may be arranged or organized in a manner different from what is shown in FIG. 6. One or more of the entities shown in FIG. 6 may be associated with one or more of the devices or entities described herein.

In some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
    generating a plurality of electronic sub-images associated with a target via a synthetic aperture radar;
    processing, by a processor, the sub-images using a sub-aperture algorithm to generate an intermediate image that includes at least one electronic pixel;
    applying, by the processor, a phase shift to the intermediate image to generate an output image including at least one phase-shifted pixel; and
    displaying the output image including the at least one phase-shifted pixel on an electronic display,
    wherein the phase shift corresponds to an exponential of the form:

$$\exp(-j4\pi R_{pixel}/\lambda),$$

where $R_{pixel}$ corresponds to a distance from a given pixel of a pixel grid to the center of an aperture of the radar, and $\lambda$ corresponds to a wavelength of a center band associated with a pulse.

2. The method of claim 1, wherein the processing of the sub-images comprises summing the sub-images.

3. The method of claim 1, where the phase shift is applied to the intermediate image on a pixel-by-pixel basis.

4. The method of claim 3, wherein the phase shift for each pixel is a function of a distance between an aircraft position and the pixel position.

5. The method of claim 1, further comprising:
    applying a coherent change detection algorithm based on the phase shift.

6. The method of claim 1, further comprising:
    applying an autofocus algorithm based on the phase shift.

7. An apparatus comprising:
    at least one processor; and
    memory having instructions stored thereon that, when executed by the at least one processor, cause the apparatus to:
    cause a plurality of electronic sub-images associated with a target to be generated via a synthetic aperture radar;

process the sub-images using a sub-aperture algorithm to generate an intermediate image including at least one pixel;

apply a phase shift to the intermediate image to generate an output image including at least one phase-shifted pixel; and a display configured to display the electronic output image including the at least one phase-shifted pixel, wherein the phase shift corresponds to an exponential of the form:

$$\exp(-j4\pi R_{pixel}/\lambda),$$

where $R_{pixel}$ corresponds to a distance from a given pixel of a pixel grid to the center of an aperture of the radar, and $\lambda$ corresponds to a wavelength of a center band associated with a pulse.

8. The apparatus of claim 7, wherein the instructions, when executed, cause the apparatus to:

process the sub-images by summing the sub-images.

9. The apparatus of claim 7, wherein the instructions, when executed, cause the apparatus to:

apply the phase shift to the intermediate image on a pixel-by-pixel basis.

10. The apparatus of claim 9, wherein the phase shift for each pixel is a function of a distance between an aircraft position and the pixel position.

11. The apparatus of claim 7, wherein the instructions, when executed, cause the apparatus to:

apply a coherent change detection algorithm based on the phase shift.

12. The apparatus of claim 7, wherein the instructions, when executed, cause the apparatus to:

apply an autofocus algorithm based on the phase shift.

13. An aircraft comprising:

a synthetic aperture radar; and a computing device configured to:

obtain data corresponding to a plurality of electronic sub-images associated with a target based on pulses emitted via the synthetic aperture radar;

process the sub-images using a sub-aperture algorithm to generate an intermediate image including at least one pixel;

apply a phase shift to the intermediate image to generate an output image including at least one phase-shifted pixel; and a display configured to display the electronic output image including the at least one phase-shifted pixel, wherein the phase shift corresponds to an exponential of the form:

$$\exp(-j4\pi R_{pixel}/\lambda),$$

where $R_{pixel}$ corresponds to a distance from a given pixel of a pixel grid to the center of an aperture of the radar, and $\lambda$ corresponds to a wavelength of a center band associated with a pulse emitted by the radar.

14. The aircraft of claim 13, wherein the computing device is configured to:

process the sub-images by summing the sub-images.

15. The aircraft of claim 13, wherein the computing device is configured to:

apply the phase shift to the intermediate image on a pixel-by-pixel basis.

16. The aircraft of claim 15, wherein the phase shift for each pixel is a function of a distance between a position of the aircraft and the pixel position.

17. The aircraft of claim 13, wherein the computing device is configured to:

apply a coherent change detection algorithm based on the phase shift; and apply an autofocus algorithm based on the phase shift.

\* \* \* \* \*